United States Patent
Chandrashekar et al.

(10) Patent No.: US 9,253,045 B2
(45) Date of Patent: Feb. 2, 2016

(54) MODELING AND SIMULATING FLOW PROPAGATION IN DYNAMIC BANDWIDTH SYSTEMS

(75) Inventors: Karthikeyan Chandrashekar, Bethesda, MD (US); Alain J. Cohen, McLean, VA (US); Paul M. Janes, Bethesda, MD (US); David Boyd, Fulton, MD (US); Stefan Znam, Rockville, MD (US); Pradeep Singh, Arlington, VA (US)

(73) Assignee: RIVERBED TECHNOLOGY, INC., San Francisco, CA (US)

( * ) Notice: Subject to any disclaimer, the term of this patent is extended or adjusted under 35 U.S.C. 154(b) by 2285 days.

(21) Appl. No.: 11/941,186

(22) Filed: Nov. 16, 2007

(65) Prior Publication Data
US 2008/0120081 A1 May 22, 2008

Related U.S. Application Data

(60) Provisional application No. 60/866,224, filed on Nov. 17, 2006.

(51) Int. Cl.
*G06F 17/50* (2006.01)
*G06G 7/62* (2006.01)
*H04L 12/24* (2006.01)

(52) U.S. Cl.
CPC .......... *H04L 41/145* (2013.01); *H04L 41/0896* (2013.01); *H04L 41/22* (2013.01)

(58) Field of Classification Search
CPC ....... H04L 41/12; H04L 41/145; H04L 41/22; H04L 47/127
USPC .......................................................... 703/13
See application file for complete search history.

(56) References Cited

U.S. PATENT DOCUMENTS

| | | | |
|---|---|---|---|
| 6,381,628 B1 * | 4/2002 | Hunt | 709/201 |
| 6,442,615 B1 * | 8/2002 | Nordenstam et al. | 709/241 |
| 6,820,042 B1 * | 11/2004 | Cohen et al. | 703/2 |
| 7,139,692 B2 | 11/2006 | Cohen et al. | |
| 7,219,047 B2 | 5/2007 | Cohen et al. | |
| 7,469,203 B2 * | 12/2008 | Cohen et al. | 703/17 |
| 2005/0055196 A1 * | 3/2005 | Cohen et al. | 703/25 |

* cited by examiner

*Primary Examiner* — David Silver
(74) *Attorney, Agent, or Firm* — Park, Vaughan, Fleming & Dowler LLP; Lexman Sahasrabuddhe (57) ABSTRACT

In a network that includes static bandwidth and dynamic bandwidth links, traffic flow at the OSI network layer is simulated at a traffic-flow level at interfaces to fixed bandwidth links, and simulated at a discrete-packet level at interfaces to dynamic bandwidth links. The resultant discrete-packet reception events at the receiving interface(s) of the dynamic bandwidth link are processed to determine the effective bandwidth/throughput of the link, as well as the allocation of this bandwidth among the individual flows through the link. The discrete-packet level receptions are used to reconstruct the parameters of the traffic flow at the network layer of the receiving interface, and this determined traffic flow is simulated accordingly at the next link, depending upon whether the next link is a static or dynamic bandwidth link.

19 Claims, 2 Drawing Sheets

MODELING AND SIMULATING FLOW PROPAGATION IN DYNAMIC BANDWIDTH SYSTEMS

This application claims the benefit of U.S. Provisional Patent Application 60/866,224, filed 17 Nov. 2006.

BACKGROUND AND SUMMARY OF THE INVENTION

This invention relates to the field of network analysis, and in particular to a method and system for assessing flows in a network that includes shared communications media.

As the demand for information flow continues to increase, establishing and maintaining an efficient network configuration to handle the increased flow typically requires complex analysis and planning. Generally, the analysis includes the identification of 'bottlenecks' where information flow is substantially impeded, or is expected to be impeded with future increases in traffic flow, and the planning includes the replacement or upgrading of equipment, or a reconfiguration of the network topology, to remove such bottlenecks, based on 'what-if' analyses of the benefits provided if such equipment or topology changes are made.

A common task for a network simulation system is "flow propagation analysis", wherein the flow throughput is determined under a variety of traffic flow scenarios. For example, a nominal data flow of 10 Mbps bandwidth may exist between a source device and a destination device, but if some of the 10 Mbps bandwidth elements between the source and destination device are also providing communication paths between other sources and destinations, the effective throughput between the original source and destination device will be dependent upon the amount of bandwidth consumed by the traffic-flow among the other communication paths. If a particular router, for example, is common to multiple high-traffic communication paths, and does not have sufficient bandwidth to support these multiple traffic flows, it will force the high-traffic flows to be 'throttled' to a lower-than-maximum throughput. Flow-propagation-analysis provides an assessment of the effective bandwidth available to each traffic flow, assuming a given traffic profile.

U.S. Pat. No. 7,139,692, "FLOW PROPAGATION ANALYSIS USING ITERATIVE SIGNALING", issued 21 Nov. 2006 to Alain Cohen, Pradeep Singh, Arun Pasupathy, Stefan Znam, and Marius Pops, teaches flow propagation analysis using 'tracers' that are iteratively propagated through a simulated network between source and destination elements, and is incorporated by reference herein. These tracers are structured to contain traffic flow information from source to destination, and to reflect changes as the flow is affected by each element along the path from source to destination. The resultant flow information at the destination corresponds to the effective throughput from the source to the destination, and the flow information at the output of each intermediate element in the network corresponds to the potentially achievable throughput through that element for the given source-to-destination flow.

Existing flow propagation analysis techniques such as taught in U.S. Pat. No. 7,139,692 effectively allocate the available bandwidth of each communication link among the traffic paths that use this link. The allocation is generally proportional to demand, although priority schemes may provide for a disproportioned allocation. For example, in a proportional allocation, if a given channel has a 12 MB maximum capacity, and is shared among three source-to-destination traffic paths with traffic demands of 3 MB, 6 MB, and 9 MB, the available 12 MB bandwidth would be allocated at this link to provide 2 MB, 4 MB, and 6 MB to these traffic flows, respectively. If the 3 MB traffic path had a higher priority than the others, it may receive its full demand of 3 MB, and the allocation to each of the others would be proportionately reduced. As each traffic flow is 'throttled back' at each over-loaded or over-subscribed link, its effective traffic demand at subsequent links is reduced, and consequently, its allocation of available bandwidth at subsequent links may be further reduced as it competes with other traffic flows at the subsequent links. The actual flow rate provided by the network to a given source-destination flow is the resultant flow rate on the last link to the destination, as this will reflect the result of each flow reduction at over-subscribed links.

Conventional flow propagation analysis techniques, however, have been found to be unsuitable for determining flows in networks that contain links with dynamic bandwidths, such as contention-based wireless links. As used herein, the term 'bandwidth' is used to indicate the realized bandwidth, i.e. the amount of actual traffic communicated per unit time, also termed the throughput of the link. As noted above, conventional flow propagation techniques operate by allocating the available bandwidth among traffic flows. If the available bandwidth is variable, a fixed allocation cannot be determined, and consequently the demand at subsequent links cannot be determined. Because the allocation at subsequent links is dependent upon the demand of each flow on the link, the allocations at all subsequent links along the path of traffic that flows through a dynamic-bandwidth link become indeterminable.

Compounding the problem further, the dynamic bandwidth of a contention based link is typically dependent upon the demand for the link in a non-linear manner, and, in a wireless communication system, the overall throughput of the link can be affected by traffic in neighboring links that share the same media.

Compounding the problem further still, in some cases, the link itself may be dynamic, such as links established among mobile devices. In addition to creating dynamic flow characteristics for the traffic on the dynamic link, these mobile devices may also dynamically become neighboring links to other links, thereby affecting the traffic flow on these other links as well.

Although dynamic bandwidth is a particularly acute problem in contention-based links, it should be noted that the aforementioned neighboring link and mobile link effects can also affect links that are typically consider fixed-bandwidth links. For example, a link with a reservation-based protocol generally exhibits fixed-bandwidth behavior. However, if this link shares the communication media with 'distant' devices that are not part of the reservation-based sub-network, the effective bandwidth will be dependent upon how far these devices are from devices in the sub-network, as well as the relative amount of traffic from the particular device that is close to these distant devices. For example, if the distance between a device on the sub-network and a distant device is such that the distant device is likely to interfere with 5% of the communications being received at the device on the sub-network, causing the sub-network to retransmit the communications, the resultant reduction in effective bandwidth on the sub-network is dependent upon the relative amount of traffic that is flowing to the affected device on the sub-network.

It would be advantageous to provide a flow propagation analysis technique that effectively and efficiently predicts flow characteristics in networks that include dynamic bandwidth links, such as contention-based links and other shared media communication links.

These advantages, and others, can be realized by a method and system wherein traffic flow at the OSI network layer is simulated at the traffic-flow level at interfaces to fixed bandwidth links, and simulated at the discrete-packet level at interfaces to dynamic bandwidth links. The resultant discrete-packet reception events at the receiving interface(s) of the dynamic bandwidth link are processed to determine the effective bandwidth/throughput of the link, as well as the allocation of this bandwidth among the individual flows through the link. The discrete-packet level receptions are used to reconstruct the parameters of the traffic flow at the network layer of the receiving interface, and this determined traffic flow is simulated accordingly at the next link, depending upon whether the next link is a static or dynamic bandwidth link.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

Figure 1:
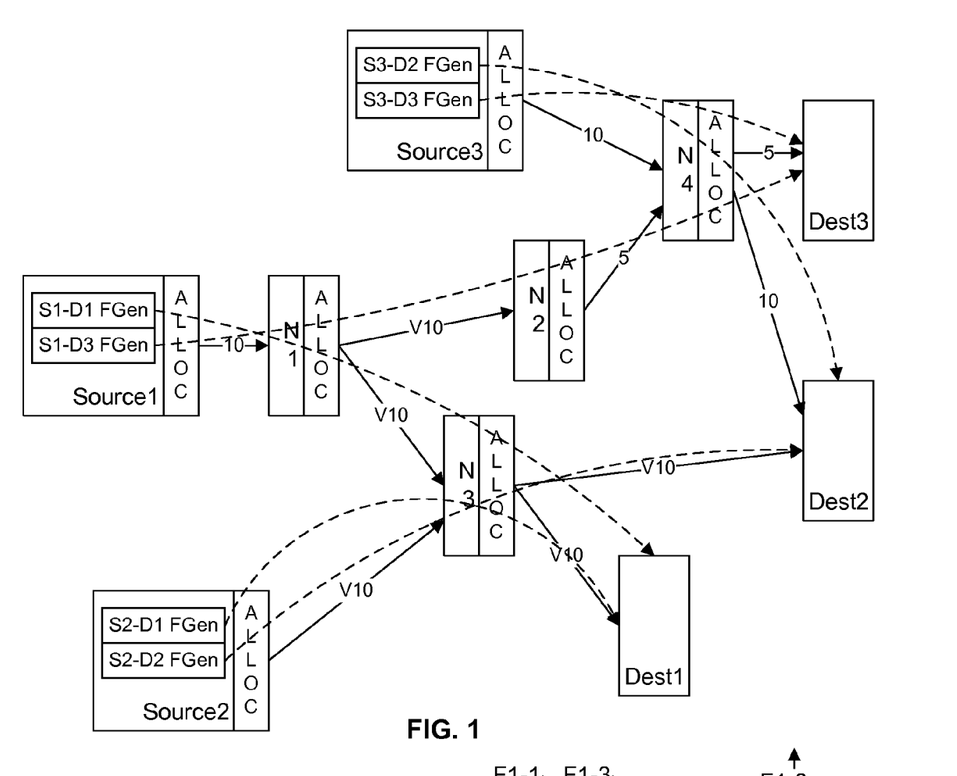
FIG. 1 illustrates an example network flow diagram.

FIG. 1 illustrates an example flow network diagram that serves to illustrate an example use of this invention; one of skill in the art will recognize that the principles of this invention are not limited to this simple example. FIG. 1 illustrates three source nodes Source1, Source2, Source3, three destination nodes Dest1, Dest2, Dest3, and four intermediate nodes N1, N2, N3, and N4.

Source1 is illustrated as generating flows to Dest1 and Dest3, via the "S1-D1 FGen" and "S1-D3 FGen" components, respectively. In like manner, Source 2 generates flows to Dest1 and Dest2 (S2-D1 FGen, S2-D2 FGen), and Source 3 generates flows to Dest2 and Dest3 (S3-D2 FGen, S3-D3 FGen). For ease of reference, it is assumed that each flow generator FGen generates a demand of 5 MB from the source to the destination. The flow of traffic from each source to each destination is illustrated using a dashed line.

Two types of links between nodes are illustrated using solid lines with an identified bandwidth capacity. The links with a prefix "V" before the bandwidth capacity are variable bandwidth links, for example, a conventional 802.11b wireless link. For ease of illustration and understanding, these variable bandwidth links are referred to hereinafter as wireless links, although one of skill in the art will recognize that the principles of this invention are not limited to wireless communication links. Note that although this invention is presented in the context of variable bandwidth links, the principles are equally applicable to variable bandwidth devices, such as a device that exhibits a non-linear throughput as a function of load.

To illustrate the typical flow analysis process, consider the flow from Source1 to Dest3. There is a fixed 10 MB bandwidth link from Source1 to N1 that will be shared between the traffic flow from Source1 to Dest1 (F1-1) and the traffic flow from Source1 to Dest3 (hereinafter F1-3). Because each of these flows is based on an assumed 5 MB demand, and the available bandwidth is 10 MB, the entire demand of each can be satisfied on this link, and a flow of 5 MB will be received at node N1 for each traffic flow F1-1 and F1-3. As used herein, input 'flow' is the maximum of the particular flow that can arrive at the node. If the link has sufficient bandwidth to support all of the input flows, then the output flow is equal to the input flow; otherwise, each flow will be 'throttled back' appropriately. As such, the input flow is more appropriately termed an input flow demand; and, because the output flow from a node may subsequently also be throttled back, the output flow is more appropriately termed an output flow demand. However, the terms input flow and output flow are used herein for ease of reference; the actual overall flow from a source to a destination will be the determined flow at the last link to the destination, dependent upon the reductions experienced, if any, at each link along the path to the destination.

Node N1 corresponds to an example wireless node with a 10 MB maximum capacity. The wireless broadcast from node N1 is received at nodes N2 and N3. Node 2 will forward any traffic that it receives that is addressed to Dest3 to node N4, and will ignore any traffic that it receives that is addressed to Dest1, using conventional routing determination techniques.

If the wireless channel from node N1 to nodes N2 and N3 were ideal, then the entire 5 MB demand from each of the two flows F1-1 and F1-3 would be transmitted over the 10 MB maximum capacity channel. However, achieving optimal use of a wireless channel is rare, and therefore less than 5 MB of traffic from each flow will be realized. Additionally, Source2 is illustrated as also having a wireless channel to node N3; if this channel is the same wireless channel that is used in the aforementioned link from node N1 to nodes N2 and N3, then the 10 MB maximum capacity channel will be shared among the flows from N1 (F1-1 and F1-3) and the flows from Source2 (F2-1 and F2-2). In an ideal case, with four 5 MB demand flows competing for a 10 MB maximum capacity channel, each flow would be limited to a maximum of 2.5 MB. With N1 and Source2 competing for channel access, a certain inefficiency will result, as each transmitter introduces a random back-off delay to allow for an equal likelihood of access, typical of conventional contention-based protocols.

In a typical flow propagation analysis system, an approximation of the effective bandwidth is used to model wireless channels, based on parameters that characterize the channel as a function of demand and other factors. However, existing analytic models of wireless channels under a variety of load conditions are often insufficient to provide accurate estimates in the complex environment of typical networks. Conversely, a discrete event network simulation at the packet level is able to provide accurate representations of packet propagation, from which the characteristics of each traffic flow can be derived, but the time required to run a simulation of a typical network at the packet level precludes the use of discrete event simulation for routine traffic flow analysis tasks.

In accordance with this invention, a simulator is configured to provide a mix of traffic-flow propagation and discrete-packet propagation to rapidly determine the flow characteristics of networks that include both fixed bandwidth links and dynamic bandwidth links. In this manner, the speed advantages of conventional flow propagation can be realized with the accuracy advantages of packet-level simulation. For the purposes of this disclosure, propagation at the traffic-flow level is defined as the communication of traffic flow parameters, such as the overall flow rate, error rate, and so on, across links. Generally, these parameters are determined at each link algorithmically, as detailed below. Propagation at the discrete-packet level, on the other hand, is defined as the communication, or attempted communication, of individual packets across links. The accumulation of statistics based on these communications or attempted communications across each link can be used to determine the aforementioned traffic flow parameters. That is, at the traffic-flow level, the traffic flow parameters are communicated directly across links; at the discrete-packet level, the traffic flow parameters are not communicated, per se, but are determinable from the flow of discrete-packets that are communicated across the links.

Figure 2A:
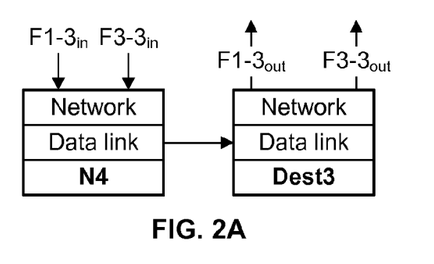
FIGS. 2A and 2B illustrate an example set of simulation models.
Figure 2B:
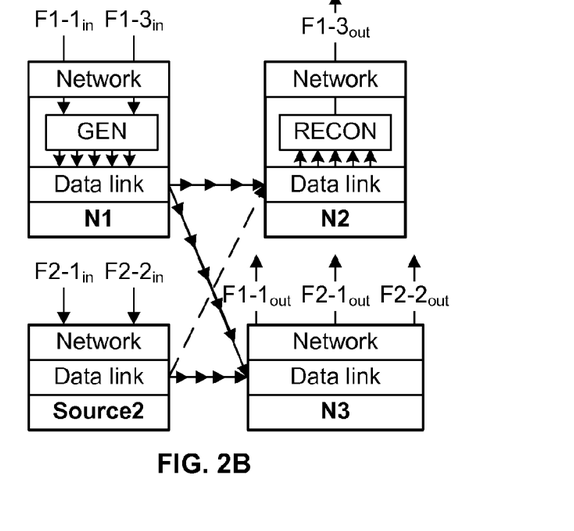

FIGS. 2A and 2B illustrate two example simulation models that facilitate traffic flow analysis of networks that include fixed and dynamic bandwidth links and/or devices.

FIG. 2A illustrates a traffic flow analysis module that provides an algorithmic determination of the allocation of bandwidth among competing traffic flows at the traffic-flow level, i.e. using the input traffic-flow demands to determine the resultant traffic-flow, without intermediate transformations of the traffic-flows. Using the link from node N4 to Dest3 of FIG. 1, node N4 receives flows F1-3 and F3-3 that are destined for Dest3, from node N2 and Source3, respectively. If each of these flows has equal priority, the traffic-flow level model will allocate its available bandwidth based on the magnitude of each flow.

In an equal-priority allocation scheme, the output flow can be expressed as:

$$Fout(i) = Min(Fin(i), (Fin(i)/Ftotal)*BW)$$

where Fin(i) is the particular input flow, Ftotal is the sum of all the input flows routed to the link, and BW is the available bandwidth of the link. Priority based allocations can similarly be algorithmically expressed, typically as either a weighted allocation, or an allocation in priority order until the bandwidth is exhausted, or a combination of both. As can be seen, the determination of the traffic flow propagation across this link is determined directly, using the input traffic flow parameters to determine the output traffic flow parameters.

As can be well appreciated, the use of an algorithmic determination of allocation at the traffic-flow level provides for a rapid determination of flow throughout the network where this algorithmic determination can be made. As noted above, if the bandwidth (BW) varies, such an algorithmic determination at the traffic-flow level will require an estimate of the realizable bandwidth, and such estimates are often inaccurate.

FIG. 2B illustrates a second flow analysis model that can provide an accurate estimate of the output flow through a dynamic bandwidth link and/or device, albeit indirectly. In accordance with this invention, each flow received at the node at the network layer is converted to an equivalent series of discrete-packet events at the data-link layer, based on the characteristics of the network and/or the particular link, and the simulation of each of the devices that access a dynamic link is performed at the discrete-packet level. If, for example, the link is configured to communicate messages using packets of 500 bytes, a flow of 5 megabytes per second is converted to a stream of packet transmission requests at 0.1 ms intervals, and these requests are simulated along with all of the other competing requests for access to the link. Depending upon the degree of realism desired, a degree of randomness can be introduced, using, for example, a random event generator having an average corresponding to the input flow rate, and a variance about this average depending upon the particular environment being modeled, using techniques common in the art. In like manner, other characteristics of the flow, such as the packet size, may also be varied, consistent with the characteristics of the actual traffic being modeled.

As illustrated in FIG. 2B, using the dynamic bandwidth link from N1 of FIG. 1 as an example, each of the input flows F1-1$_{in}$ and F1-3$_{in}$ at the network layer are used to generate corresponding discrete-packets at the data-link layer, via a packet generator GEN (illustrated only in node N1 for convenience; all transmitting nodes with an interface to a dynamic link will include a packet generator for generating discrete-packets at the data-link layer). Each transmitting node at a dynamic bandwidth link, such as Source2, will include a similar packet generator between the OSI network and data-link layers. The simulation of the traffic flow at the discrete-packet level is illustrated in FIG. 2B as a stream of arrowheads across each link.

The generated packets from each flow F1-1$_{in}$ and F1-3$_{in}$ will be queued for transmission from N1, using the appropriate protocol model at node N1. For example, if the flows are of equal priority, they will typically be queued based on a first-in first-out scheduling scheme. If one of the flows has a higher priority, its packets may be placed ahead of packets from the lower priority flow, using any of a variety of conventional priority-based allocation schemes.

If there is no interference on this channel, the packets in the queue at node N1 will propagate across the link to nodes N2 and N3, based on the bandwidth of the link and the likelihood of incurring uncorrectable errors across the link. As such, the packets generated by flow F1-3 from N1 to N2 will merely be dependent upon the allocation of the overall link bandwidth between the flows F1-1$_{in}$ and F1-3$_{in}$, and the likelihood of uncorrectable errors at the data-link layer.

It is significant to note, however, that if Source2 uses the same communication channel/link as node N1, the transmissions from node N1 to node N3 will be affected by the flow of packets from Source2 to N3, because simultaneous transmissions from node N1 and Source2 to node N3 will interfere with each other. As illustrated in FIG. 2B, each of these flows are simulated as communicating discrete-packet events via the OSI data-link layer. By modeling the flows that are input or output from a dynamic link at a discrete-packet transmission-reception level, the channel/link access delay for each packet, the likelihood of each packet surviving transmission across the link, and other detailed characteristics and effects that are experienced at the data-link layer, can be determined. From this data and corresponding statistics, the characteristics of the flow being accepted at each node that receives data via a dynamic bandwidth link can be converted, and/or resolved, and/or reconstructed, for each link that is simulated at the discrete-packet level.

It is also significant to note that although, in the example of FIG. 1, Source2 is not illustrated as having a link with N2 (due, perhaps, to the distance between Source2 and N2), the fact that N1's intended communications with node N3 will be affected by Source2's intended communications with node N3, this 'slow-down' of communications from node N1 caused by Source2 will have an adverse effect on the communications from node N1 to node N2, when the queue at node N1 is delayed by communications from Source2 to N3.

The simulator simulates the attempted transmission of the discrete-packet events at the data-link layer from each of the sources on this link, N1 and Source2, and produces a resultant set of successfully received packets at the data-link layer of the receivers N2 and N3. These received discrete-packet events are processed by a flow-reconstruction module RECON at each receiver (illustrated only in node N2, for convenience), which is configured to determine the flow characteristics at the network layer corresponding to these received discrete-packet events at the data-link layer. In a preferred embodiment of this invention, the simulated discrete events are configured to convey meta-data, such as an identification of the particular flow, that facilitates the processing of the resultant received events to determine the appropriate resultant flow characteristics.

In a typical embodiment, the traffic flows are simulated by propagating traffic-flow 'tracers' at the network layer, each traffic-flow tracer including an identifier of itself, and an identifier of the flow and corresponding flow parameters. At the source nodes that generate the tracers, the flow parameters are initialized to the desired/maximum flow from the node.

At the interfaces to static bandwidth links, these tracers are communicated directly to the data-link layer for propagation across each link. The flow parameters being conveyed by each tracer from each transmitting node are updated directly, using, for example, the algorithmic demand-based allocation discussed above with respect to FIG. 2A.

At the interfaces to dynamic bandwidth links, the generator GEN module at each transmitting node uses the flow parameters of each tracer at the network layer to generate a corresponding set of discrete-packets at the data-link layer, each generated packet including the originating tracer and flow identifiers. The reconstruction RECON module at each receiving node distinguishes the received packets based on the tracer-identifier, and determines flow statistics/parameters (packets per second, bits per second, error rate, etc.) based on the arrival of packets of each tracer-identifier. The reconstruction element creates a tracer corresponding to each received tracer-identifier, including the flow-identifier and the determined flow parameters, and provides it to the network layer interface at the node. In this manner, each tracer is effectively 'updated' as its identifier is propagated across each link of FIG. 2B, similar to the updating of the tracer in FIG. 2A.

By generating discrete-packets based on flow information in each tracer, and reconstructing each tracer with flow information based on the reception of these packets, the tracers that are produced by the reconstruction module at the interfaces to a dynamic link (FIG. 2B) are virtually indistinguishable from the tracers propagated from the interfaces to a static link (FIG. 2A). Consequently, the propagation of the traffic flow at the network layer is substantially independent of which links are simulated at the traffic-flow level or the discrete-packet level.

In the example of FIG. 2B, node Source2 will generate traffic-flow tracers corresponding to each of the flows F2-1 and F2-2, and node N1 will receive traffic-flow tracers corresponding to flows F1-1 and F1-3. Because Source2 and node N1 access a dynamic bandwidth link, they are configured to generate discrete-packets at the data-link layer, each packet including an identification of the particular tracer and the flow that generated the tracer. These packets are simulated as being broadcast from Source2 and N1, based on the particular protocol being modeled at this link/channel, resulting in the simulated arrival of packets at nodes N2 and N3.

Because node N2 is configured to provide the path from Source1 to Dest3, node N2 will 'ignore' each packet at the data-link layer that does not include Dest3 as the destination in its flow-identifier. In this case, each of the resultant tracers provided at the network layer of N2 will correspond to the flow F1-3, and will reflect the tracer identifier that was assigned to the tracer when it was generated at Source1. The only difference between a tracer that arrives at node N1 as $F1\text{-}3_{in}$ in FIG. 2B, and the corresponding tracer that leaves N2 as $F1\text{-}3_{out}$ will be the flow parameters contained in each, thereby reflecting the 'throttling back' of the flow F1-3 as it passes from N1 to N2, similar to the 'throttling back' of flows across static bandwidth links.

In like manner, at node N3, which receives packets at the data-link layer from both N1 and Source2, destined for Dest1 and Dest2, the reconstruction element (not illustrated) will provide tracers of $F1\text{-}1_{out}$, $F2\text{-}1_{out}$, and $F2\text{-}2_{out}$, corresponding to the tracers received by node N1 as $F1\text{-}1_{in}$ and Source2 as $F2\text{-}1_{in}$ and $F2\text{-}2_{in}$, respectively, with updated flow parameters.

If the bandwidth of the simulated link is sufficient to accommodate all of the requested events, including the overhead associated with acquiring channel access and the like, and the quality of the link is good, the received events will substantially correspond to the transmit events, and the output flow characteristics $F1\text{-}1_{out}$, $F1\text{-}3_{out}$, etc. will substantially correspond to the input flow characteristics $F1\text{-}1_{in}$, $F1\text{-}3_{in}$, etc. Otherwise, the packet reception rates will be lower than the packet transmit request rate, and the output flow characteristics will reflect the degree of 'throttling back' that each flow experiences, in the same manner that the output flow characteristics of FIG. 2A reflect either a satisfaction of the input demand or a throttling back of each flow.

It is significant to note that although the propagation of flow across a network is illustrated above using the simulation of tracer elements at the network layer, one of skill in the art will recognize that other flow analysis techniques can be used as well. That is, if an alternative technique is used for network layer flow propagation and analysis, the packet generator GEN of FIG. 2B is suitably modified to receive the available flow information and generate packets based on this network layer information, and the reconstruction RECON module is suitably modeled to reconstruct this same network layer information, modified based on the reception of the generated packets.

Because the simulator need only perform discrete-packet level simulation for the elements that interface with dynamic bandwidth links, the time required to simulate streams of requested transmissions and resultant successful receptions will be relatively slight, compared to a discrete-packet level simulation of the entire network. In a preferred embodiment, the simulation is performed for each link only until a steady-state flow is determined, to avoid unnecessary computations. U.S. Pat. No. 7,219,047, "SIMULATION WITH CONVERGENCE-DETECTION SKIP-AHEAD", issued 15 May 2007 to Alain Cohen, Pradeep Singh, and Arun Pasupathy, and incorporated by reference herein, teaches a simulation technique that includes termination of continuous input events upon detection of a non-quiescent steady-state condition. That is, although the packet event generators (GEN) are configured to provide continuous discrete-packet events corresponding to each input flow, once the simulated elements achieve a steady state of a given parameter, such as a steady flow rate for each flow at the network layer, within a specified variance, the simulation need not continue until there is a change to the flows that produced this steady state condition.

To demonstrate the overall interaction of flow propagation using this mixed layer approach, assume, for example, that the simulation of the dynamic link among nodes N1, Source2, N2, and N3 of FIG. 1, provides a packet reception rate for flow F1-3 of 2 MB, as compared to a 2.5 MB flow that would have been provided if the link provided a full 10 MB bandwidth to the four demanding flows. This 2 MB flow from N2 is easily accommodated by the 5 MB link from N2 to N4. At N4, the F1-3 flow of 2 MB competes with the F3-3 flow of 5 MB from Source3 for an allocation of the available 5 MB bandwidth from N4 to Dest3. Because the link from N4 to Dest3 is a fixed bandwidth link, it will be simulated at the traffic-flow level, using the algorithmic model discussed above with respect to FIG. 2A. Assuming equal-priority flows, the output flow F1-3 from N4 to Dest3 will be ((2/7)*5 MB) and the output flow F3-3 will be ((5/7)*5 MB). These flows reflect the reduction in throughput experienced across each link in the respective paths, and correspond to the overall throughput of the flows from Source1 to Dest3, and Source3 to Dest3, respectively.

Consistent with most simulation systems and the actual networks that they model, the reduced flows at each link will result in a feedback message to each transmitting node along the path to reduce its demand, so that in an eventual steady state condition, each of the particular flows will reflect substantially the same flow rate at each link. It is significant to note that as each flow 'demand' is throttled back, the amount of contention at each dynamic bandwidth link will be reduced, thereby allowing the flow rate to increase. This increased flow rate is suitably propagated, potentially affecting the allocations at each subsequent link. By iteratively simulating the network elements, at either the traffic-flow level or discrete-packet level as appropriate, the dynamic nature of the flows will be modeled, until the network flows converge to a steady-state condition. In a simpler embodiment of this feedback construct, the traffic flow at each destination node is considered to represent the steady-state condition of the network, and this traffic flow at each destination node is communicated back to each corresponding source node to represent the demand achievable at the source node. Applying the destination-determined traffic flow to each source will generally result in an immediate convergence/re-convergence of the network corresponding to this satisfiable demand.

Figure 3:
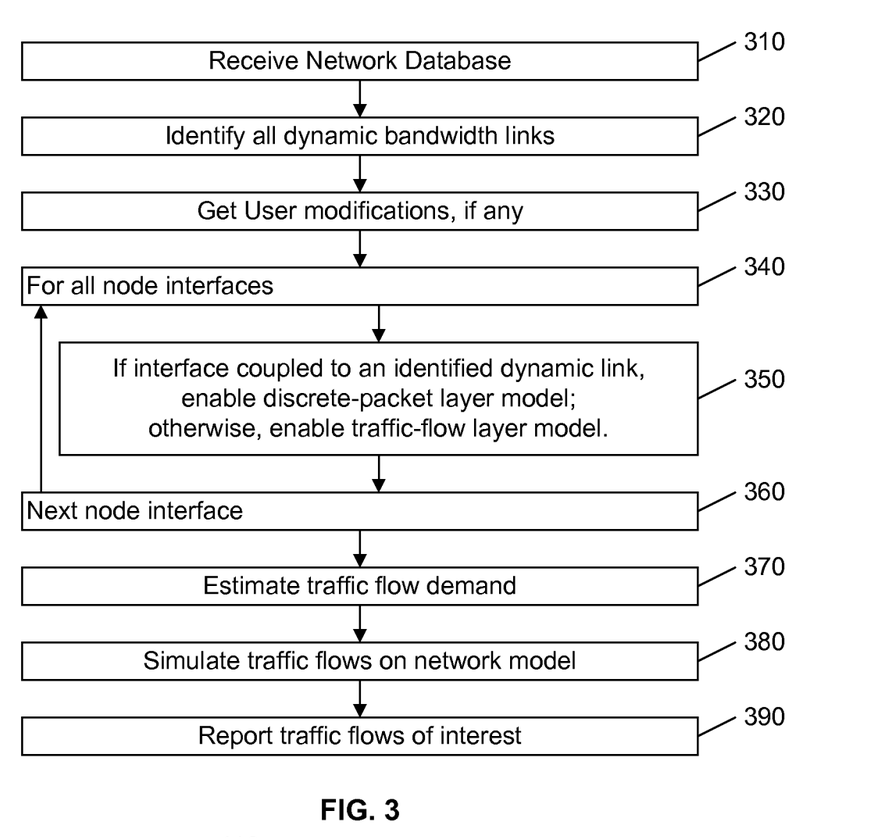
FIG. 3 illustrates an example flow diagram for a flow analysis process.

FIG. 3 illustrates an example flow diagram for a flow analysis process in accordance with this invention.

At 310, the database containing the network description is accessed. The term database is used herein in its broadest sense, meaning a collection of data that is organized for access by one or more applications; the collection may be organized as a single entity, or as a distributed collection of data elements. The network database includes a description of the interconnections among elements/nodes of the network, as well as a description of the configuration of each element. The configuration of each element may range from a simple default configuration that is applicable to the particular type of element, to a detailed description of each available option of the element, including, for example, an identification of the protocol used at each interface to the device.

At 320, the dynamic bandwidth links of the network are identified. This identification may be based on explicit or implicit information in the network description. For example, the particular type of device, or the particular type of interface or protocol may necessarily imply that the corresponding link will exhibit load-dependent throughput, such as interfaces and protocols used for wireless communications. Alternatively, the user and/or network provider may explicitly identify particular links as links that exhibit a varying bandwidth.

Optionally, at 330, the current user of the flow analysis program/process may modify the identification of dynamic links, depending upon the purpose of the flow analysis. For example, the user may identify entire sections of a network as containing static links, if the user is not interested in the additional accuracy and/or precision provided by the above described simulation of dynamic links within the particular section. Conversely, the user may define select conventionally-defined static links as being dynamic links, to perform a more detailed analysis of particular links or segments of the network.

The loop 340-360 processes each network element to determine if an interface of the element provides access to one or more identified dynamic links. If so, at 350, the model of the interface is configured to enable the discrete-packet level model of the interface, including the corresponding packet generating and flow reconstructing elements (GEN and RECON) elements to provide the appropriate transformations between the network and data-link layers, as detailed above. If not the default state, the interfaces that do not access an identified dynamic link are configured to enable the simpler, typically algorithmic, traffic-flow level model of the interface.

At 370, the user and/or the network provider identifies the expected demand for traffic flow between source and destination nodes. This demand may be derived from monitored traffic on the actual network, predictions of future traffic growth or decline, and so on. Typically, network flow analysis is performed to either predict future performance or to diagnose reported performance degradation, and will use a combination of flow demand estimates based on prior network flow patterns and predicted/"what-if" flow patterns.

When each of the interfaces is appropriately configured to use either the traffic-flow level model or discrete-packet level model, and the traffic flows through the network are estimated, the traffic flow through the network is simulated, at 380. This traffic-flow simulation may use any of a variety of flow propagation techniques, depending upon the capabilities of the particular simulation engine. In an embodiment of this invention as detailed above, tracers are used to convey traffic flow parameters at the network-layer traffic. Interfaces to static links are configured to modify the traffic flow parameters using a traffic-flow level model, which is typically algorithmic. Interfaces to dynamic links are configured to generate discrete-packets at the data-link layer corresponding to received tracers and to reconstruct the tracers at the network-layer corresponding to received packets. This tracer-modification and/or packet-generation and tracer-reconstruction process continues until the continued propagation of tracers from the source nodes produce no significant change to the determined flow characteristics at each interface, or until some processing time limit is exceeded.

The resultant flow characteristics are reported to the user at 390. Preferably, a user interface allows the user to identify the flows of interest that are to be reported. One of skill in the art will recognize that a variety of output formats and options can be provided. In an example embodiment, a graphic representation of the network is provided, and colors are used to identify the characteristics of each flow. For example, colors may be used to represent the magnitude of each flow, to distinguish under-utilized and over-demanded links, to represent the magnitude of throttling-back of each flow overall, or at each link, and so on.

Figure 4:
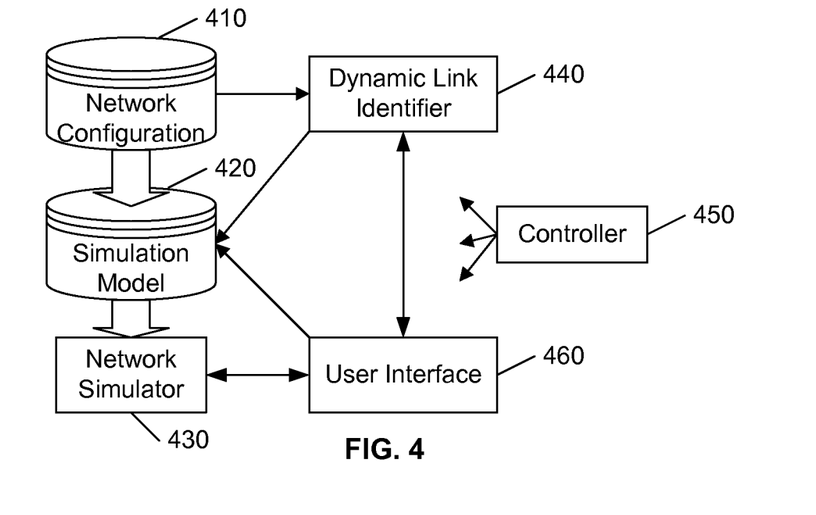
FIG. 4 illustrates an example flow analysis system.

FIG. 4 illustrates an example block diagram of a flow analysis system for embodying this invention. A controller 450 is configured to control the interactions among the components 430, 440, 460, as detailed below.

A database 410 includes a description of the network, including the configuration of elements within the network. This data is used as the basis of a model of the network that is suitable for simulation; this model is illustrated as a separate database 420 for clarity, although some simulators may be configured to access the database 410 directly.

A dynamic link identifier 440 is configured to identify dynamic bandwidth links in the modeled network, and to interact with a user interface 460 to allow modifications to this dynamic bandwidth link identification. The dynamic link identifier enable the model of each interface to identified dynamic bandwidth links in the simulation model to be simulated at the discrete-packet level, and the model of each interface to non-dynamic bandwidth links to be simulated at the traffic-flow level.

The user interface 460 is also configured to enable a user to define the demand for traffic flows between and among nodes of the network. As discussed above, this demand can be obtained from historic records, estimates of future demand, and so on. Preferably, historical records are used to automatically initialize each of the flows to a default value, and the user interface 460 is configured to enable modifications to these default values.

The simulator 430 is configured to apply the defined traffic flow demands to the simulation model 420, using techniques as discussed above, to determine the steady-state traffic flow between and among nodes. The simulator 430 is also configured to provide the resultant traffic flow characteristics, and other parameters, for presentation to the user via the user interface 460, as also discussed above.

The foregoing merely illustrates the principles of the invention. It will thus be appreciated that those skilled in the art will be able to devise various arrangements which, although not explicitly described or shown herein, embody the principles of the invention and are thus within its spirit and scope. For example, although the invention is presented using a static set of traffic flow patterns, one of skill in the art will recognized that variable flow patterns can also be analyzed. With reference to FIG. 3, the block 390 can be configured to report the determined flows based on the flow patterns at a given time interval, then loop to 370 to receive changes to the flow demand at a subsequent time interval. When the changes are received, they are provided to simulation process 380, and the process is repeated for this new set of traffic flow demands. These and other system configuration and optimization features will be evident to one of ordinary skill in the art in view of this disclosure, and are included within the scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof, the software portions being embodied on a non-transient computer-readable medium;

f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements, and can include an immeasurable number of elements.

We claim:

1. A method of simulating a network comprising:
   identifying, to a simulation system, one or more links of the network as a dynamic bandwidth link,
   identifying, to the simulation system, one or more links of the network as a static bandwidth link,
   defining, to the simulation system, a plurality of traffic flow demands, and
   simulating, by the simulation system, application of the traffic flow demands on a model of the network,
   wherein simulating the application of the traffic flow demands includes:
      simulating each interface to each link identified as a static bandwidth link using a traffic-flow level model of the interface, and
      simulating each interface to each link identified as a dynamic bandwidth link using a discrete-packet level model of the interface.

2. The method of claim 1, wherein simulating the discrete-packet level model includes generating a plurality of packets for propagation from a transmitting interface to the link based on a received traffic flow at the transmitting interface.

3. The method of claim 2, wherein simulating the discrete-packet level model includes generating a resultant traffic flow at a receiving interface to the link based on received packets of the plurality of packets from the transmitting interface.

4. The method of claim 3, including determining traffic flow parameters based on the received packets.

5. The method of claim 3, wherein simulating the traffic-flow level model includes determining traffic flow parameters based on a bandwidth of the link and a total amount of traffic flow demands on the link.

6. The method of claim 1, wherein simulating the traffic-flow level model includes determining traffic flow parameters based on a bandwidth of the link and a total amount of traffic flow demands on the link.

7. The method of claim 1, including updating the traffic flow demands at a transmitter interface to at least one link based on resultant flow parameters at a receiver interface to the at least one link.

8. The method of claim 1, wherein defining the plurality of traffic flow demands includes defining traffic flow demands between each pair of a plurality of pairs of source nodes and destination nodes.

9. The method of claim 8, wherein simulating the application of traffic flow demands provides resultant traffic flow parameters at each destination node, and
   the method includes updating the traffic flow demand at the source node of at least one pair based on the resultant traffic flow parameters at the destination node of the at least one pair.

10. The method of claim 8, wherein:
    simulating the application of the traffic flow demands includes:

generating traffic-flow tracers at each source node of each pair based on the traffic flow demands from the source, propagating the traffic-flow tracers along one or more paths from the source node of each pair to the destination node of the pair;

each traffic-flow tracer includes at least one traffic flow parameter; and propagating the traffic-flow tracers includes modification of the at least one traffic flow parameter at one or more links along the one or more paths.

11. The method of claim 10, wherein:

the traffic-flow level model of at least one interface to the one or more links is configured to update the at least one traffic flow parameter based on a bandwidth of the link and a total amount of traffic flow demand at the link, the discrete-packet level model of at least one transmit interface to the one or more links is configured to generate a series of transmit packets corresponding to the at least one traffic flow parameter, and the discrete-packet level model of at least one receive interface to the one or more links is configured to update the at least one traffic flow parameter based on a simulated receipt of received packets from the series of transmit packets.

12. The method of claim 1, including providing a display of resultant flows at one or more links, based on the application of the traffic flow demands on the model of the network.

13. A method of simulating a network comprising:

defining, to a network simulation system, traffic flow demand for each flow-pair of a plurality of flow-pairs of source and destination nodes, generating, by the network simulation system, traffic-flow tracers at each source node corresponding to the traffic flow demand for each flow-pair that includes the source node, each traffic-flow tracer including at least one traffic flow parameter corresponding to the traffic flow demand, and propagating, by the network simulation system, the traffic-flow tracers across links of paths from the source nodes to the destination nodes, the traffic flow parameter being updated at each link to reflect a resultant traffic flow across the link, wherein at each link:

if the link is identified as a link having a fixed bandwidth, the traffic flow parameter is updated based on the fixed bandwidth and a total traffic flow demand at the link, the total traffic flow demand being based on the traffic flow parameters of the traffic-flow tracers arriving at the link, and if the link is identified as a link having a dynamic bandwidth, the traffic flow parameter is updated based on a simulated receipt of discrete-packets propagated across the link, the discrete-packets being generated for propagation across the link based on the traffic flow parameters of the traffic-flow tracers arriving at the link.

14. The method of claim 13, including updating the traffic flow demand at the source node of at least one flow-pair based on the traffic flow parameter of one or more traffic-flow tracers arriving at the destination node of the at least one flow-pair.

15. The method of claim 13, wherein the at least one traffic flow parameter includes a measure of quantity of traffic per unit time.

16. A non-transient computer-readable medium that includes a computer program that is configured to enable a processor to execute a simulation process that includes:

defining traffic flow demand for each flow-pair of a plurality of flow-pairs of source and destination nodes of a network, generating traffic-flow tracers at each source node corresponding to the traffic flow demand for each flow-pair that includes the source node, each traffic-flow tracer including at least one traffic flow parameter corresponding to the traffic flow demand, and propagating the traffic-flow tracers across links of paths of the network from the source nodes to the destination nodes, the traffic flow parameter being updated at each link to reflect a resultant traffic flow across the link, wherein at each link:

if the link is identified as a link having a fixed bandwidth, the traffic flow parameter is updated based on the fixed bandwidth and a total traffic flow demand at the link, the total traffic flow demand being based on the traffic flow parameters of the traffic-flow tracers arriving at the link, and if the link is identified as a link having a dynamic bandwidth, the traffic flow parameter is updated based on a simulated receipt of discrete-packets propagated across the link, the discrete-packets being generated for propagation across the link based on the traffic flow parameters of the traffic-flow tracers arriving at the link.

17. The computer-readable medium of claim 16, wherein the simulation process includes updating the traffic flow demand at the source node of at least one flow-pair based on the traffic flow parameter of one or more traffic-flow tracers arriving at the destination node of the at least one flow-pair.

18. A system that includes:

a model of a network, a dynamic link identifier that is configured to identify:

one or more links of the network as a dynamic bandwidth link, and one or more links of the network as a static bandwidth link, a simulator that is configured to simulate application of traffic flow demands on the model of the network, wherein simulating the application of the traffic flow demands includes:

simulating each interface to each dynamic bandwidth link using a traffic-flow level model of the interface, including determining traffic flow parameters based on a bandwidth of the link and a total amount of traffic flow demands on the link, and simulating each interface to each dynamic bandwidth link using a discrete-packet level model of the interface, including:

generating a plurality of packets for propagation from a transmitting interface to the link based on a received traffic flow at the transmitting interface, and generating a resultant traffic flow at a receiving interface to the link based on received packets of the plurality of packets from the transmitting interface, wherein the traffic flow demands include traffic flow demands between each pair of a plurality of pairs of source nodes and destination nodes, and wherein the simulator is configured to update the traffic flow demand at the source node of at least one pair based on resultant traffic flow parameters at the destination node of the at least one pair.

19. A system that includes:
a model of a network,
a dynamic link identifier that is configured to identify:
- one or more links of the network as a dynamic bandwidth link, and
- one or more links of the network as a static bandwidth link, a simulator that is configured to simulate application of traffic flow demands on the model of the network,
wherein simulating the application of the traffic flow demands includes:
- simulating each interface to each dynamic bandwidth link using a traffic-flow level model of the interface, including determining traffic flow parameters based on a bandwidth of the link and a total amount of traffic flow demands on the link, and
- simulating each interface to each dynamic bandwidth link using a discrete-packet level model of the interface, including:
  - generating a plurality of packets for propagation from a transmitting interface to the link based on a received traffic flow at the transmitting interface, and
  - generating a resultant traffic flow at a receiving interface to the link based on received packets of the plurality of packets from the transmitting interface, and a user interface that is configured to provide a display of resultant flows at one or more links, based on the application of the traffic flow demands on the model of the network.

* * * * *